US011810367B2

(12) United States Patent
Fang et al.

(10) Patent No.: US 11,810,367 B2
(45) Date of Patent: Nov. 7, 2023

(54) SYSTEM AND METHOD FOR DETERMINING IF A VEHICLE IS PARKED

(71) Applicant: Toyota Research Institute, Inc., Los Altos, CA (US)

(72) Inventors: Chao Fang, Sunnyvale, CA (US); Kuan-Hui Lee, San Jose, CA (US); Logan Michael Ellis, Pleasanton, CA (US); Jia-En Pan, Mountain View, CA (US); Kun-Hsin Chen, Mountain View, CA (US); Sudeep Pillai, Santa Clara, CA (US); Daniele Molinari, Redwood City, CA (US); Constantin Franziskus Dominik Hubmann, Menlo Park, CA (US); T. Wolfram Burgard, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 248 days.

(21) Appl. No.: 17/361,424

(22) Filed: Jun. 29, 2021

(65) Prior Publication Data

US 2022/0414388 A1 Dec. 29, 2022

(51) Int. Cl.
*G06V 20/58* (2022.01)
*G06T 7/246* (2017.01)
(Continued)

(52) U.S. Cl.
CPC ............ *G06V 20/584* (2022.01); *G01S 17/89* (2013.01); *G06F 18/21* (2023.01);
(Continued)

(58) Field of Classification Search
CPC .. G06V 20/584; G06V 2201/08; G06V 10/25; G06V 10/82; G01S 17/89;
(Continued)

(56) References Cited

U.S. PATENT DOCUMENTS

2019/0308620 A1* 10/2019 Sapp .................. G01S 13/86
2019/0354786 A1* 11/2019 Lee .................... G06N 3/084
(Continued)

OTHER PUBLICATIONS

Sun et al, A3D LiDAR Data-Based Dedicated Road Boundary Detection Algorithm for Autonomous Vehicles, Feb. 28, 2019, IEEE Access, vol. 7, pp. 29623-29638 (Year: 2019).*
Meng et al., Loop-Closure Detection with a Multiresolution Point Cloud Histogram Mode in Lidar Odometry and Mapping for Intelligent Vehicles, Jun. 2021, IEEE/ASME Transaction on Mechatronics, 26(3): pp. 1307-1317. (Year: 2021).*
(Continued)

*Primary Examiner* — Aaron W Carter
*Assistant Examiner* — Kathleen M Broughton
(74) *Attorney, Agent, or Firm* — Christopher G. Darrow; Darrow Mustafa PC

(57) ABSTRACT

Described herein are systems and methods for determining if a vehicle is parked. In one example, a system includes a processor, a sensor system, and a memory. Both the sensor system and the memory are in communication with the processor. The memory includes a parking determination module having instructions that, when executed by the processor, cause the processor to determine, using a random forest model, when the vehicle is parked based on vehicle estimated features, vehicle learned features, and vehicle taillight features of the vehicle that are based on sensor data from the sensor system.

17 Claims, 8 Drawing Sheets

(51) Int. Cl.
  G01S 17/89    (2020.01)
  G06T 7/521    (2017.01)
  G06F 18/21    (2023.01)
  G06F 18/243   (2023.01)
  G06N 3/044    (2023.01)

(52) U.S. Cl.
  CPC ....... G06F 18/24323 (2023.01); G06N 3/044 (2023.01); G06T 7/246 (2017.01); G06T 7/521 (2017.01); *G06T 2207/10028* (2013.01); *G06T 2207/30252* (2013.01); *G06V 2201/08* (2022.01)

(58) Field of Classification Search
  CPC ... G06F 18/21; G06F 18/24323; G06N 3/044; G06T 7/246; G06T 7/521; G06T 2207/10028; G06T 2207/30252
  See application file for complete search history.

(56) References Cited

U.S. PATENT DOCUMENTS

2019/0385025 A1* 12/2019 McMichael ............ G06V 10/82
2020/0103523 A1*  4/2020 Liu ....................... G01S 13/865
2020/0234066 A1   7/2020 Lee et al.
2020/0410853 A1* 12/2020 Akella ..................... G08G 1/04

OTHER PUBLICATIONS

Behrendt et al., "Is This Car Going to Move? Parked Car Classification for Automated Vehicles," 2019 IEEE Intelligent Vehicles Symposium (IV), 8 pages, Paris, France. Jun. 9-12, 2019.
Lee et al., "PillarFlow: End-to-end Birds-eye-view Flow Estimation for Autonomous Driving," 7 pages, arXiv:2008.01179V3 [cs.CV] Aug. 29, 2020.
Melli et al., "Predictive and Probabilistic Tracking to Detect Stopped Vehicles," 2005 Seventh IEEE Workshops on Applications of Computer Vision, vol. 1, 6 pages (2005).
Darms et al., "Classification and Tracking of Dynamic Objects with Multiple Sensors for Autonomous Driving in Urban Environments," 2008 IEEE Intelligent Vehicles Symposium, 6 pages (2008).
Maddalena et al., "Self Organizing and Fuzzy Modelling for Parked Vehicles Detection," International Conference on Advanced Concepts for Intelligent Vision Systems, Abstract (2009).
Held et al., "Robust Real-Time Tracking Combining 3D Shape, Color, and Motion," The International Journal of Robotics Research 35, 28 pages (2015).
Petrovskaya et al., "Model Based Vehicle Detection and Tracking for Autonomous Urban Driving," Autonomous Robots 26.2 (2009): 123-139.
Urmson et al., "Autonomous driving in urban environments: Boss and the urban challenge." Journal of Field Robotics 25.8 (2008): 425-466.

* cited by examiner

SYSTEM AND METHOD FOR
DETERMINING IF A VEHICLE IS PARKED

TECHNICAL FIELD

The subject matter described herein relates, in general, to systems and methods for determining if a vehicle is parked.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have autonomous and/or semi-autonomous control systems that can pilot the vehicle in certain situations. Autonomous control systems can generally pilot the vehicle with little to no operator input. In contrast, semi-autonomous systems generally require operator input but can override and/or augment the driver's input under certain situations, such as an impending collision. In some cases, if a vehicle has an autonomous control system, the autonomous control system may disengage and revert to a semi-autonomous or manual control system in situations where the autonomous control system cannot confidently plan the path of the vehicle due to uncertainty regarding the movement of external objects, such as other vehicles.

As such, the detection of external objects and the predicted movements of these external objects are important. In particular, when the external object is a vehicle, determining if the vehicle is parked or not parked can play a role in navigating urban areas, as a parked vehicle may be assumed to be static, but a non-parked vehicle's future motion may be uncertain. This uncertainty may propagate to a downstream planner for decision-making and path planning and may cause the disengagement of the autonomous driving system.

SUMMARY

This section generally summarizes the disclosure and is not a comprehensive explanation of its full scope or all its features.

In one embodiment, a system for determining if a vehicle is parked includes a processor, a sensor system, and a memory. Both the sensor system and the memory are in communication with the processor. The memory includes a parking determination module having instructions that, when executed by the processor, cause the processor to determine, using a random forest model, when the vehicle is parked based on vehicle estimated features, vehicle learned features, and vehicle taillight features.

In another embodiment, a method for determining if a vehicle is parked includes the step of determining, using a random forest model, when the vehicle is parked based on vehicle estimated features, vehicle learned features, and vehicle taillight features of the vehicle.

In yet another embodiment, a non-transitory computer readable medium includes instructions that, when executed by a processor, cause the processor to determine, using a random forest model, when a vehicle is parked based on vehicle estimated features, vehicle learned features, and vehicle taillight features.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
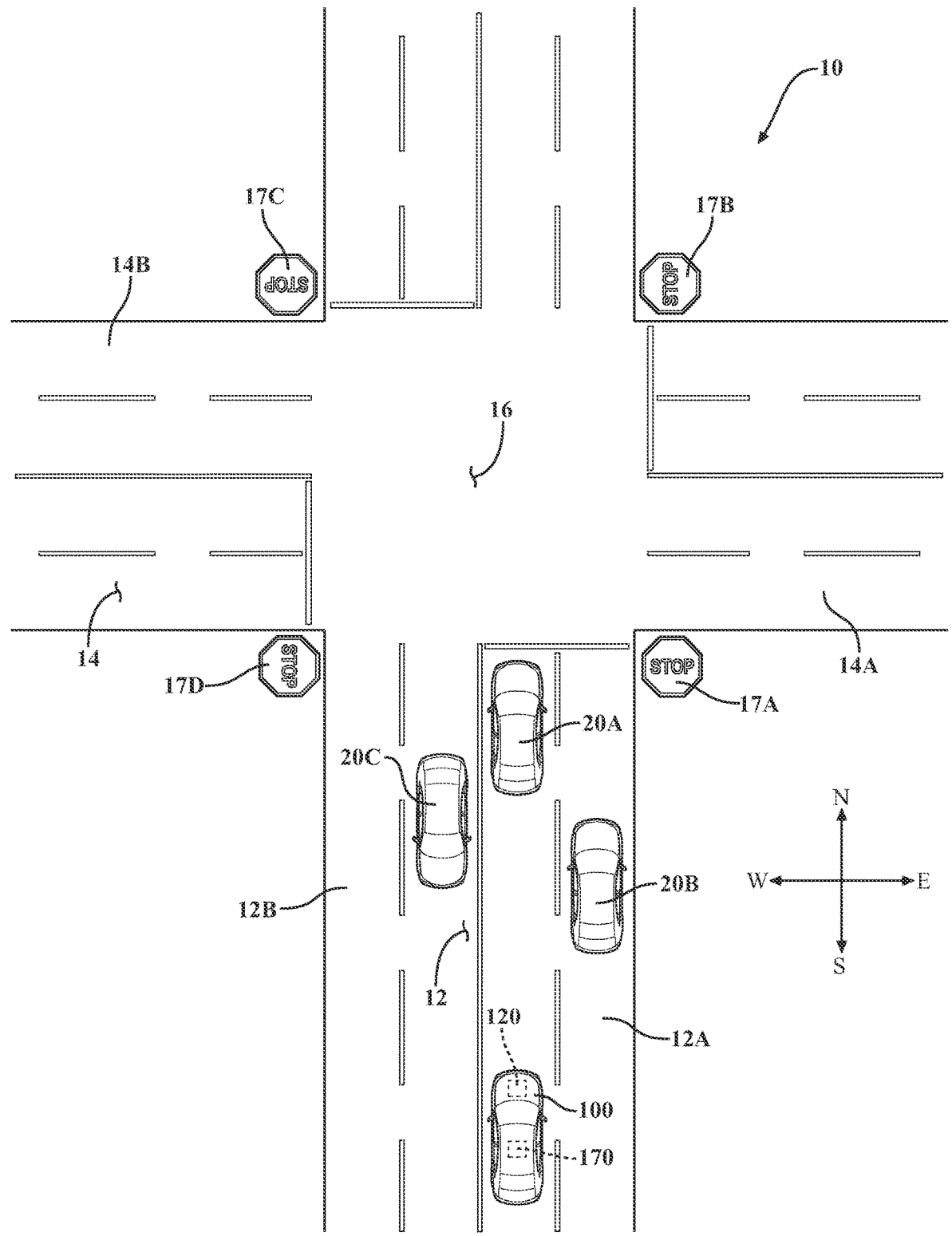
FIG. 1 illustrates a scene with an ego vehicle having a parked vehicle classifier system that determines if nearby vehicles are parked.

Described are a parked vehicle classifier system and related method that can determine if an external vehicle is parked. Moreover, some vehicles include autonomous and/or semi-autonomous vehicle control systems that may control the operation of a vehicle. As explained in the background section, autonomous vehicle control systems may pilot the vehicle from one destination to another with little to no human input. Conversely, semi-autonomous vehicle control systems require input from the driver to travel from one destination to another but can augment the driver's inputs in certain situations, such as avoiding a collision. In either case, knowledge regarding the predicted movements of external vehicles can be important regarding the operation of these systems.

The parked vehicle classifier system can determine if other vehicles near an ego vehicle are parked using a random forest classifier that considers different types of features, including vehicle estimated features, vehicle learned features, and vehicle taillight features of the vehicles near the ego vehicle. A vehicle is determined to be parked if it should be treated as a static obstacle by one or more vehicle control systems of the ego vehicle.

The use of a random forest classifier has several advantages. For example, it is fairly easy to train and converge with large-scale training data. Additionally, the random forest classifier is relatively lightweight and can achieve very fast runtime performance, which may be critical in motion planning for a vehicle. Further still, the random forest classifier is a nonparametric method with a tree structure, which is flexible and allows analysis and debugging in failure cases.

In one example, a vehicle may be determined to be parked if the vehicle is expected to remain stationary with enough confidence to be driven around or overtaken by the ego vehicle. This may include unoccupied vehicles that are not autonomous vehicles, permanently disabled vehicles, vehicles undergoing repair, and vehicles that are being loaded or unloaded with cargo and/or people. As such, vehicles that are merely standing such that they are waiting for some external action to occur before they move would not be considered parked vehicles.

Examples of non-parked vehicles that are standing could include vehicles waiting for a signal change, vehicles in slow or nonmoving traffic, and/or vehicles waiting for a pedestrian or other vehicle to move out of the way. It should be understood that the examples given are merely examples, and there are numerous other situations when a vehicle is parked such that the vehicle is expected to remain stationary with enough confidence to be driven around or overtaken by the ego vehicle. Additionally, the type of vehicle that may be parked can vary significantly and should not be limited. Moreover, vehicles can include any type of vehicle capable of moving persons and/or objects from one place to another. For example, vehicles could include automobiles, trucks, motorcycles, bicycles, scooters, and the like. As such, the vehicle may be motorized or nonmotorized transport.

Referring to FIG. 1, illustrated is a scene 10 having an ego vehicle 100 that includes a parked vehicle classifier system 170. The scene 10 is an example to provide some context regarding how the parked vehicle classifier system 170 operates. It should be understood that the scene 10 is just one type of example environment that the parked vehicle classifier system 170 may be utilized within. Here, the scene 10 includes a road 12 and a road 14 that meet each other at an intersection 16. The road 12 includes a northbound lane 12A and a southbound lane 12B. The road 14 includes an eastbound lane 14A and a westbound lane 14B. In this example, the intersection 16 is a four-way stop, as indicated by the stop signs 17A-17D. As such, a vehicle approaching the intersection 16 must first stop before entering the intersection 16.

Located in the northbound lane 12A is the ego vehicle 100 that includes the parked vehicle classifier system 170. The ego vehicle 100, as will be explained later, may be a semi-autonomous and/autonomous vehicle. The ego vehicle 100 also includes a sensor system 120 for sensing the environment, including portions of the scene 10 in which the ego vehicle 100 operates.

Also located in the northbound lane 12A are vehicles 20A and 20B. In this example, vehicle 20A is stopped near the intersection 16 and is waiting to proceed through the intersection 16. As such, based on the definition given above regarding a parked vehicle, the vehicle 20A is not a parked vehicle and is merely waiting in response to a signal, in this case, in the form of the stop sign 17A. After briefly stopping, the vehicle 20A will proceed through the intersection 16. As to the vehicle 20B, this vehicle is also located in the northbound lane 12A. In this example, the vehicle 20B is parked in that it remains stationary until the ego vehicle 100 passes or otherwise overtakes the vehicle 20B.

Located in the southbound lane 12B is another vehicle 20C that has successfully moved through the intersection 16 and is continuing and a southbound direction. Unlike the vehicle 20A and the vehicle 20B, the vehicle 20C is currently moving and will not be determined to be parked.

As will be explained in greater detail later, the parked vehicle classifier system 170 can determine, using a random forest model, when a vehicle, such as the vehicle 20B, is parked based on vehicle estimated features, vehicle learned features, and vehicle taillight features of the vehicle that are based on sensor data from the sensor system 120. By determining which vehicles are parked in which ones are not, the autonomous or semi-autonomous vehicle system of the ego vehicle 100 can spend more time and/or computational resources focusing on moving or soon to be moving objects, such as the vehicles 20A and 20C.

Figure 2:
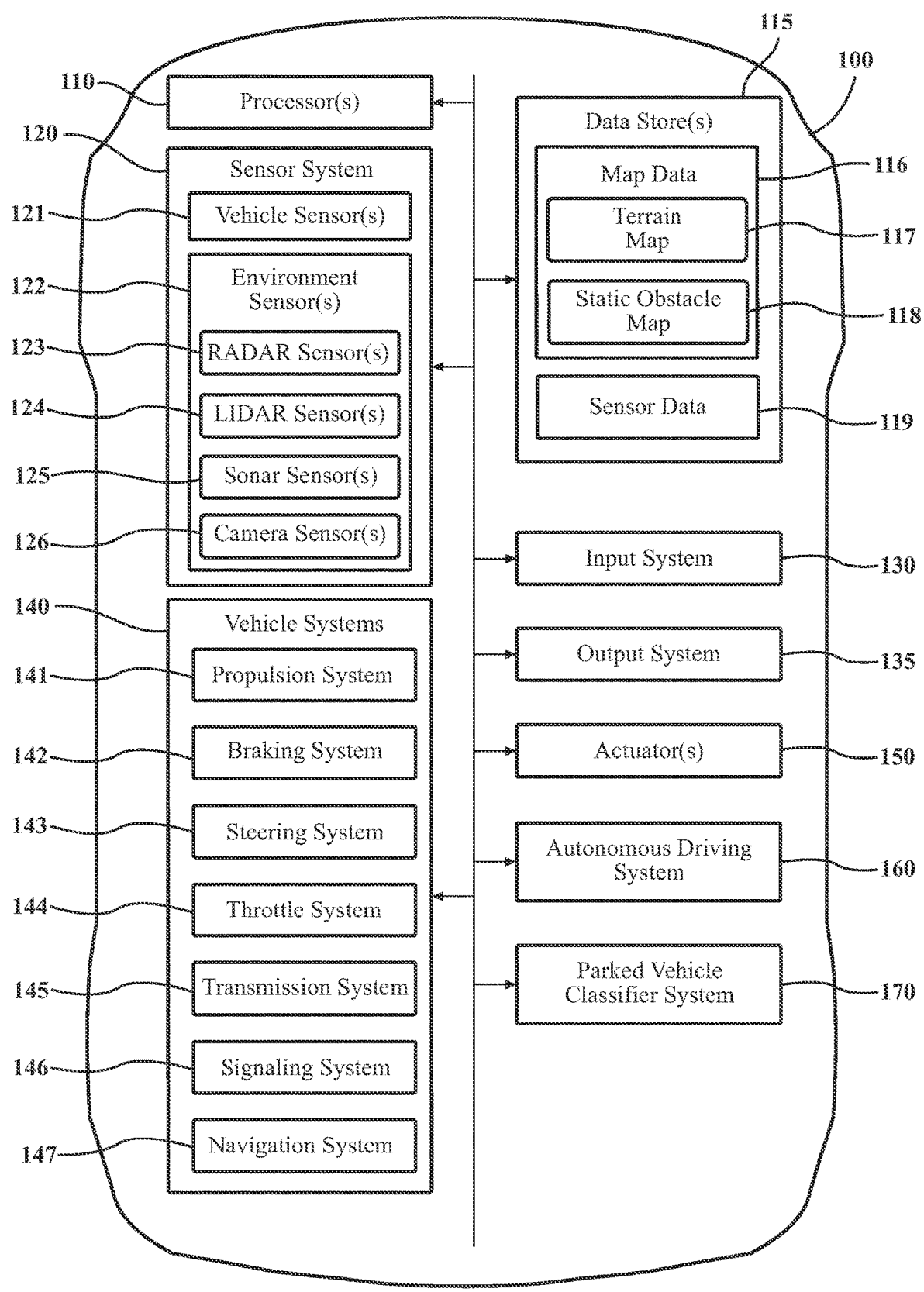
FIG. 2 illustrates one example of the vehicle having the parked vehicle classifier system.

Referring to FIG. 2, an example of the ego vehicle 100 is illustrated. As used herein, the ego vehicle 100 is any form of powered transport. In one or more implementations, the ego vehicle 100 is an automobile. While arrangements will be described herein with respect to automobiles, it will be understood that embodiments are not limited to automobiles. In some implementations, the ego vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 160.

The ego vehicle 100 also includes various elements. It will be understood that in various embodiments, it may not be necessary for the ego vehicle 100 to have all of the elements shown in FIG. 2. The ego vehicle 100 can have any combination of the various elements shown in FIG. 2. Further, the ego vehicle 100 can have additional elements to those shown in FIG. 2. In some arrangements, the ego vehicle 100 may be implemented without one or more of the elements shown in FIG. 2. While the various elements are shown as being located within the ego vehicle 100 in FIG. 2, it will be understood that one or more of these elements can be located external to the ego vehicle 100. Further, the elements shown may be physically separated by large distances and provided as remote services (e.g., cloud-computing services).

Some of the possible elements of the ego vehicle 100 are shown in FIG. 2 and will be described along with subsequent figures. However, a description of many of the elements in FIG. 2 will be provided after the discussion of FIGS. 3-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the ego vehicle 100 includes a parked vehicle classifier system 170. The parked vehicle classifier system 170 may be incorporated within the autonomous driving system 160 or may be separate as shown. As will be explained in more detail later in this description, the parked vehicle classifier system 170 may determine, using a random forest model, when a vehicle, such as the vehicle 20B, is parked based on vehicle estimated features, vehicle learned features, and vehicle taillight features of the vehicle that are based on sensor data from the sensor system 120.

Figure 3:
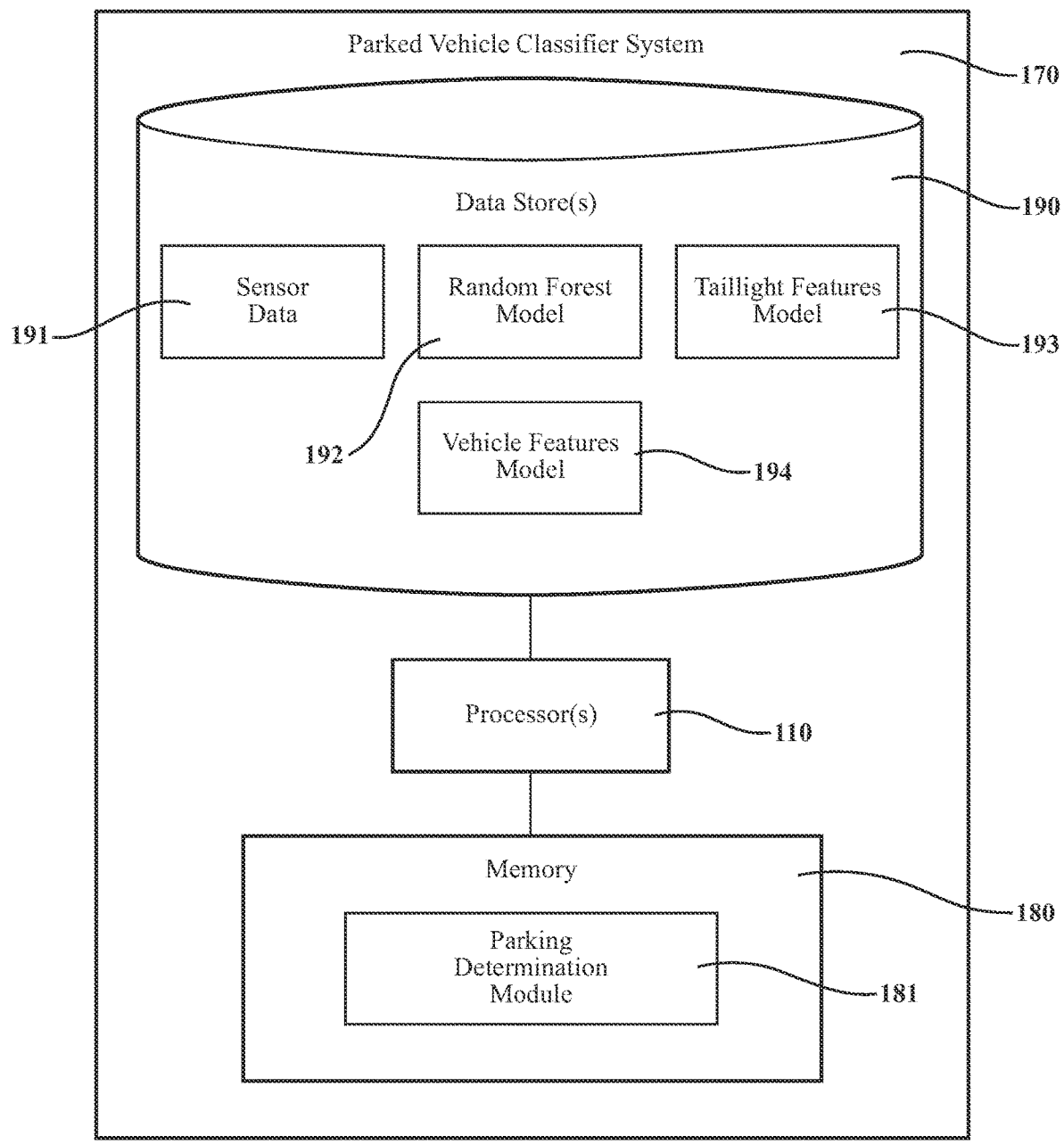
FIG. 3 illustrates a more detailed view of the parked vehicle classifier system.

With reference to FIG. 3, one embodiment of the parked vehicle classifier system 170 is further illustrated. As shown, the parked vehicle classifier system 170 includes one or more processor(s) 110. Accordingly, the processor(s) 110 may be a part of the parked vehicle classifier system 170, or the parked vehicle classifier system 170 may access the processor(s) 110 through a data bus or another communication path. In one or more embodiments, the processor(s) 110 is an application-specific integrated circuit that is configured to implement functions associated with a parking determination module 181. In general, the processor(s) 110 is an electronic processor such as a microprocessor that is capable of performing various functions as described herein. In one embodiment, the parked vehicle classifier system 170 includes a memory 180 that stores the parking determination module 181. The memory 180 is a random-access memory (RAM), read-only memory (ROM), a hard disk drive, a flash memory, or other suitable memory for storing the parking determination module 181. The parking determination module 181 is, for example, computer-readable instructions that, when executed by the processor(s) 110, cause the processor(s) 110 to perform the various functions disclosed herein.

Furthermore, in one embodiment, the parked vehicle classifier system 170 includes one or more data store(s) 190. The data store(s) 190 is, in one embodiment, an electronic data structure such as a database that is stored in the memory 180 or another memory and that is configured with routines that can be executed by the processor(s) 110 for analyzing stored data, providing stored data, organizing stored data, generating stored data, and so on. Thus, in one embodiment, the data store(s) 190 stores data used by the parking determination module 181 in executing various functions. In one embodiment, the data store(s) 190 includes sensor data 191, along with, for example, other information that is used by the parking determination module 181. The sensor data 191 may include some or all of the sensor data 119 shown in FIG. 2 and described later in this disclosure and/or sensor data generated by the sensor system 120.

As such, the sensor data 191 may include data captured from the sensor system 120. As explained later, the sensor system 120 may have one or more environment sensor(s) that may include radar sensor(s) 123, LIDAR sensor(s) 124, sonar sensor(s) 125, and/or camera sensor(s) 126. Of course, it should be understood that these are just some examples of the types of sensors that may form the sensor system 120 and may generate the sensor data 191.

The data store(s) 190 may include one or more algorithms or neural networks for interpreting the sensor data 191 or data provided by other systems and subsystems of the ego vehicle 100. In one example, the data store(s) 190 may include a random forest model 192 that can determine if an external vehicle is parked. The data store(s) 190 may also include a taillight features model 193 that can extract features regarding the taillights of one or more vehicles external to the ego vehicle 100. The data store(s) 190 may also include a vehicle features model 194 can determine one or more learned features of vehicles external to the ego vehicle 100. Details regarding these models will be provided later in this description.

Accordingly, the parking determination module generally includes instructions that function to control the processor(s) 110 to determine, using the random forest model 192, when one or more vehicles external to the ego vehicle 100 are parked based on vehicle estimated features generated by the evaluating the sensor data 191, vehicle learned features generated by the vehicle features model 194, and vehicle taillight features generated by the taillight features model 193 of the other vehicles that are external to the ego vehicle 100.

Figure 4:
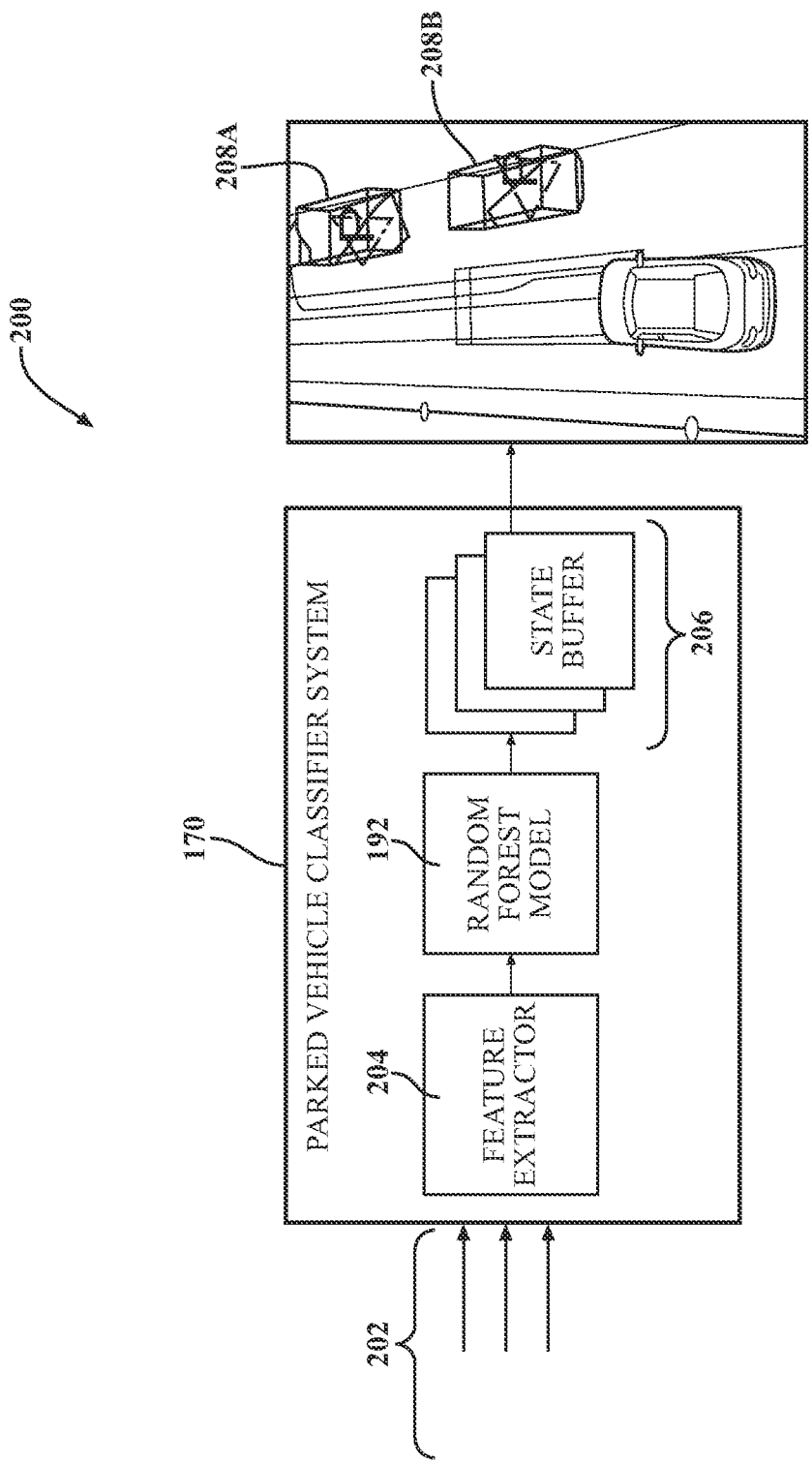
FIG. 4 illustrates a flowchart of the operation of the parked vehicle classifier system.

Referring to FIG. 4, illustrated is a flowchart 200 that illustrates a process flow for determining if a vehicle external to the ego vehicle is parked. Again, as stated earlier, the vehicle may be considered to be parked if the vehicle is expected to remain stationary with enough confidence to be driven around or overtaken by the ego vehicle 100. Here, the parked vehicle classifier system 170 receives inputs 202 that may come from a number of different sources, such as other vehicle systems and subsystems of the ego vehicle 100 or even from systems and subsystems that are external from the ego vehicle 100, such as a cloud-based server and/or edge server, such as a roadside edge server. The inputs 202 may include the sensor data 191 but can also include inputs from other systems, neural networks, discrete algorithms, and the like that have interpreted the sensor data 191, such as object detection and/or object tracking systems.

A feature extractor 204, which could be one or more models such as the taillight features model 193 and/or the vehicle features model 194, may provide a list of features to the random forest model 192. The random forest model 192 then outputs one or more state buffers that can identify a vehicle and determine if the vehicle is parked at different moments in time.

Returning to FIG. 3, the random forest model 192, as stated previously, may consider vehicle estimated features, vehicle learned features and vehicle taillight features. With regards to the vehicle estimated features, the vehicle estimated features can include a number of different features such as an object type of the external vehicle, a distance from a center point of the external vehicle to a road boundary, an estimated velocity of the external vehicle, an estimated absolute speed of the external vehicle, a distance to the nearest intersection from the external vehicle, a map location type, a free lane ratio, and an edge distance between an edge of the external vehicle and the road boundary. The vehicle estimated features may be determined by interpreting data from the sensor system 120 of the ego vehicle 100 and/or map information.

The object type of the external vehicle provides information regarding the vehicle type of the external vehicle. For example, object type could include automobile, motorcycle, bicycle, truck, delivery truck, tractor-trailer, tractor, bicycle, scooter, and the like. The estimated velocity of the external vehicle indicates the velocity of the external vehicle. The velocity may be provided in different directions, such as the X and Y directions. The absolute speed of the vehicle is self-explanatory and is the absolute speed of the external vehicle. The vehicle estimated features may also include other information, such as determining if the vehicle 20A is located in a parking lane and/or map location type, which may indicate the type of surface the vehicle 20B is parked on, such as an intersection, normal lane, parked lane, etc.

Figure 5:
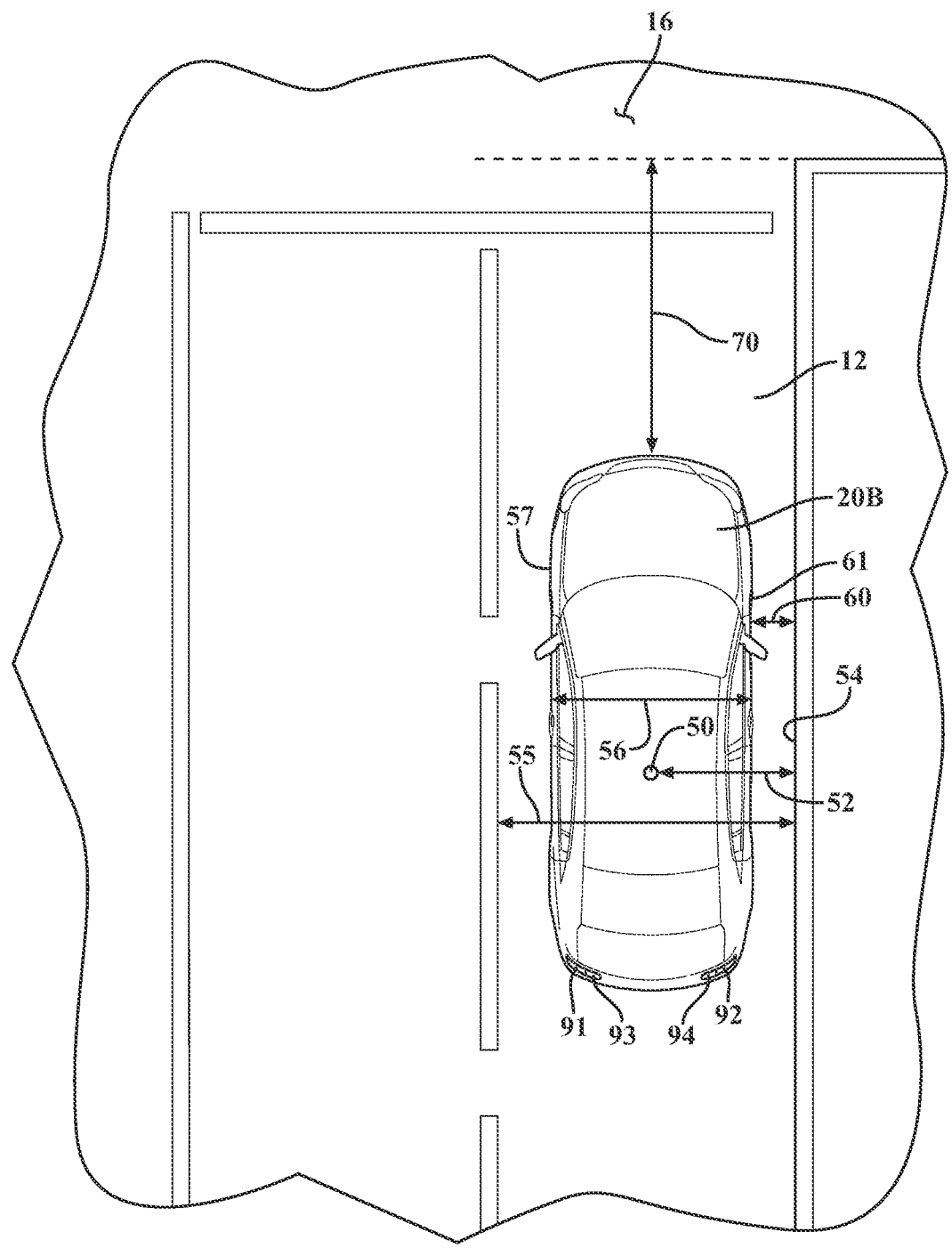
FIG. 5 illustrates a scene detailing different types of vehicle estimated features that the parked vehicle classifier system may utilize to determine if a particular vehicle is parked.

As to some of the other vehicle estimated features, reference is made to FIG. 5. This figure illustrates the vehicle 20B of FIG. 1 in greater detail. Here, the vehicle estimated features can include the distance 52 from a center point 50 of the vehicle 20B to the road boundary 54. The vehicle estimated features can also include the distance 70 to the nearest intersection 16. The free lane ratio is the ratio of the width 55 of the northbound lane 12A with respect to the width 56 of the vehicle 20B. The edge distance 60 may be the distance between a side 61 of the vehicle 20B nearest the road boundary 54 and the road boundary 54.

Figure 6:
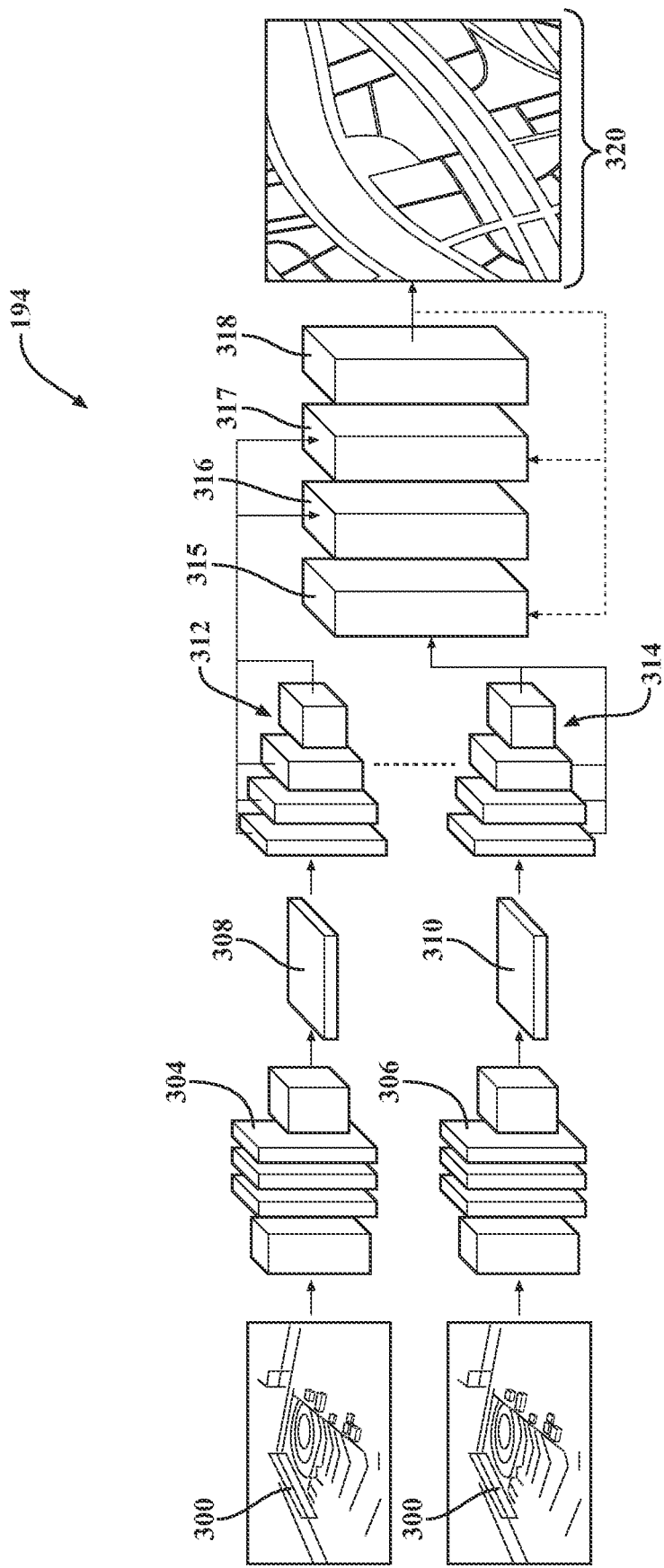
FIG. 6 illustrates a neural network that may be utilized to determine vehicle learned features that the parked vehicle classifier system may utilize.

The vehicle learned features generated by the vehicle features model 194 may include a learned velocity and/or learned absolute speed of the external vehicle. The learned velocity may include velocities in the X and Y directions. In one example, the vehicle features model 194 may be one or more neural networks that can determine the vehicle learned features. Referring to FIG. 6, illustrated is one example of the vehicle features model 194 that may determine the vehicle learned features. It should be understood that the vehicle features model 194 of FIG. 6 is just but one example of a model that may determine the vehicle learned features of the external vehicle.

Here, the vehicle features model 194 is a deep learning framework that receives, as inputs, two separate and consecutive LIDAR sweeps 300 and 302, which may be in the form of point clouds, from the LIDAR sensor(s) 124 of the sensor system 120, at two different moments in time. The consecutive LIDAR sweeps 300 and 302 may include information from a scene that includes the external vehicle that will be determined by the parked vehicle classifier system 170 as being parked or not being parked.

The consecutive LIDAR sweeps 300 and 302 may be aligned into the same coordinate frame. For example, the original coordinates of the LIDAR sweep 302 at time t−1 may be transformed to the coordinate frame of the LIDAR sweep 300 at time t using the odometry information of the ego vehicle 100.

The vehicle features model 194 may use pillar feature networks 304 and 306 to extract 2D birds-eye view embeddings 308 and 310 from the LIDAR sweeps 300 and 302, respectively. Moreover, the vehicle features model 194 may perform a voxelization step applied to the LIDAR sweeps 300 and 302 by discretizing the x-y plane, thus creating a set of "pillars" (grid cells) in birds-eye-view. The voxelized point cloud is structured as a (D, P, N)-shaped tensor where D is the number of point descriptors, P is the number of pillars, and N is the number of points per pillar. The vehicle features model 194 may use D=9, where the first four values denote coordinates x, y, z, and reflectance r. The next five values are the distances to the arithmetic mean $x_c$, $y_c$, $z_c$ of all points in a pillar and the offset $x_p$, $y_p$ from the pillar center. Next, this input tensor is processed by a simplified version of PointNet to get a feature map of shape (C, P, N). The vehicle features model 194 may further compress the feature map by a max operation over the last dimension, resulting in a (C, P) encoded feature map with a C-dimensional feature embedding for each pillar. Finally, the encoded features are scattered back to original pillar locations to create a pseudo-image tensor of shape (C, H, W), where H and W indicate the height and width of the 2D birds-eye view embeddings 308 and 310.

To accurately associate the 2D birds-eye view embeddings 308 and 310, the vehicle features model 194 conducts a 2-D birds-eye view flow estimation. The flow estimator 317 may be based on a PWC-Net model having architecture parameters adjusted such as receptive field and correlation layer parameters to account for the maximum relative motion that would be expected to be encountered between consecutive LIDAR sweeps (given the time delta between frames, grid resolution, and typical vehicle speeds). The pillar features are further encoded via feature pyramid networks 312 and 314 and fed into a warping function 315. A cost volume layer 316 is then used to estimate the flow, where the matching cost is defined as the correlation between the two feature maps. Finally, a context network 318 is applied to exploit contextual information for additional refinement. The context network 318 is a feed-forward CNN based on dilated convolutions, along with batch normalization and ReLU.

The output 320 of the vehicle features model 194 may include the learned velocity and/or learned absolute speed of the external vehicle. The output 320 may then be provided to the random forest model 192.

Regarding vehicle taillight features generated by the taillight features model 193, these features may provide information relating to one or more taillights of an external vehicle. For example, referring back to FIG. 5, illustrated is the vehicle 20B. The vehicle 20B includes taillights 91-94. In this example, the taillights 91 and 92 are brake lights, while the taillights 93 and 94 are turn signal lights, which may indicate a direction in which the vehicle 20B intends to turn. Again, this is just one example of a taillight configuration for the vehicle. In some cases, the taillights and brake lights may be integrated. Furthermore, the taillights 91-94 or subset thereof may act as hazard lights.

Figure 7:
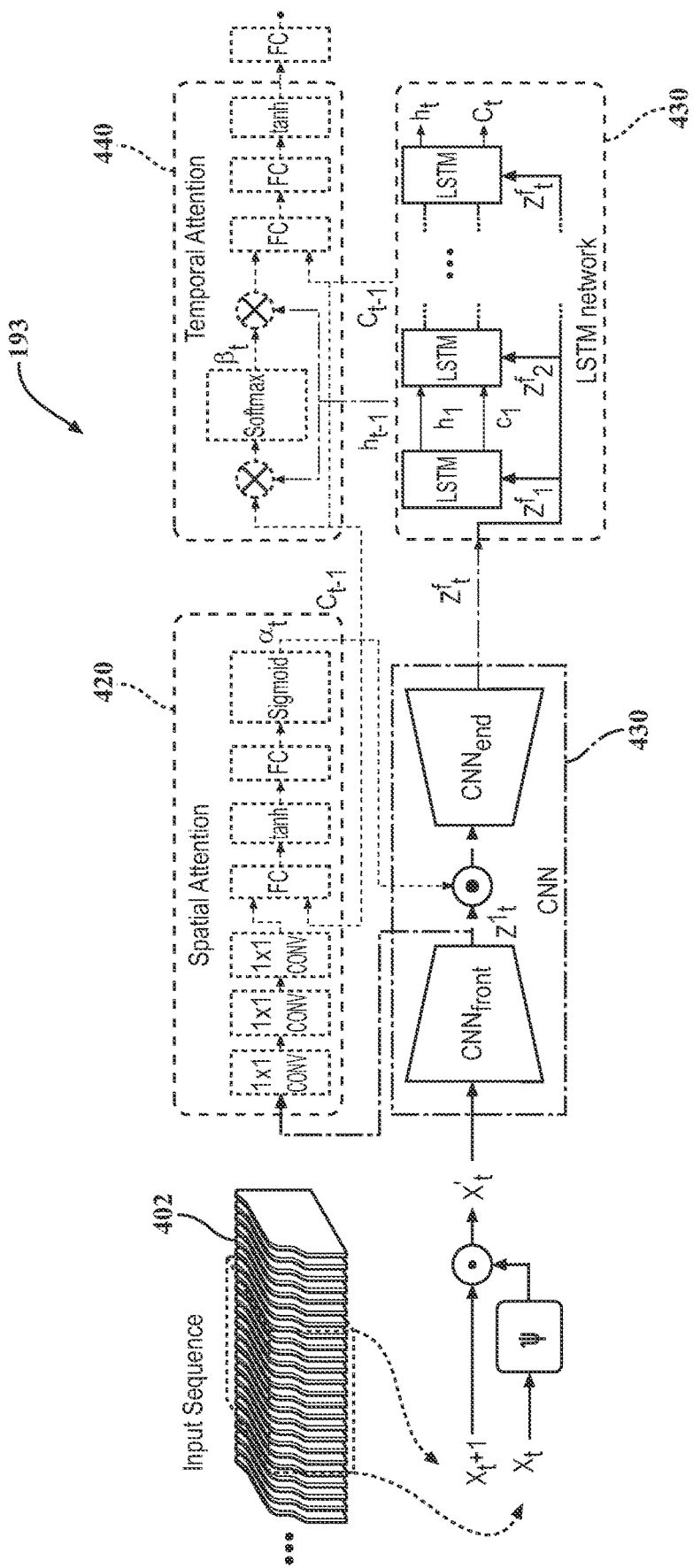
FIG. 7 illustrates a neural network that may be utilized to determine vehicle taillight features that the parked vehicle classifier system may utilize.

The taillight features model 193 may be in the form of one or more neural networks. Referring to FIG. 7, illustrated is one example of the taillight features model 193. The taillight features model 193 may be described in U.S. Pat. App. Pub. No. 2020/0234066, which is hereby incorporated by reference in its entirety. Briefly, the taillight features model 193 may utilize a convolutional neural network (CNN) of a CNN-long short-term memory (CNN-LSTM) framework on a selected region of the sequence of images according to a spatial attention model for a vehicle taillight recognition task. The CNN-LSTM framework integrates a spatial attention model 420 and a temporal attention model 440 for vehicle taillight recognition.

Here, an input image sequence 402 of the taillight features model 193 is a chunk of a video sequence that may have been captured by the camera sensor(s) 126 of the sensor system 120. The video sequence may be sampled by window-sliding along the temporal direction. In this configuration, an instance detection/segmentation technique is used to extract bounding boxes from video frames of the input image sequence 402.

Each image of the input image sequence 402 is forwarded to certain layers of a CNN 410 to obtain deep features. The spatial attention model 420 from the CNN 410 selectively focuses on a selected region (e.g., bounding boxes) in the input image sequence 402 using an attention weight given for each region and forwards the element-wise attention weights to the CNN 410, which is forwarded to the LSTM network 430. The LSTM network 430 selects frames within the selected region of the sequence of images according to a temporal attention model 440 for vehicle taillight state recognition. As such, the taillight features model 193 can determine vehicle taillight features, such as a taillight off probability, a left taillight on probability, a right taillight on probability, and a hazard light on probability. Again, more details regarding the taillight features model 193 are described in U.S. Pat. App. Pub. No. 2020/0234066, which, as noted previously, is hereby incorporated by reference in its entirety.

Referring back to FIG. 3, as stated previously, the parking determination module 181 generally includes instructions that function to control the processor(s) 110 to determine, using the random forest model 192, when one or more vehicles external to the ego vehicle 100 are parked based on vehicle estimated features generated by the evaluating the sensor data 191, vehicle learned features generated by the vehicle features model 194, and vehicle taillight features generated by the taillight features model 193 of the other vehicles that are external to the ego vehicle 100. The random forest model 192 may utilize ensemble-learning method for classification that operates by constructing a multitude of decision trees at training time and outputting the class that is the mode of the classes of the individual trees. In this case, the class output by the random forest model 192 is a determination of a particular external vehicle is parked or not.

In one example, as best shown in FIG. 4, the output of the random forest model 192 may include a plurality of state buffers 206. Each state buffer may relate to a different moment in time, indicating if a particular vehicle is parked or not. The state buffers 206 may then be provided to one or more downstream processes, such as processes associated with the autonomous driving system 160. For example, if an external vehicle is parked, the autonomous driving system 160 can make appropriate decisions regarding how to pilot the ego vehicle 100 around one or more parked vehicles. Furthermore, because certain external vehicles are determined to be parked, the autonomous driving system can focus more time and/or computational resources on tracking the movement of other objects that are not parked.

In one example, the state buffers 206 and provided an object detection system that outputs one or more bounding boxes 208A and 208B with respect to the ego vehicle 100. The bounding boxes 208A and 208B may include information if the vehicle represented by the bounding boxes 208A and 208B are parked.

Figure 8:
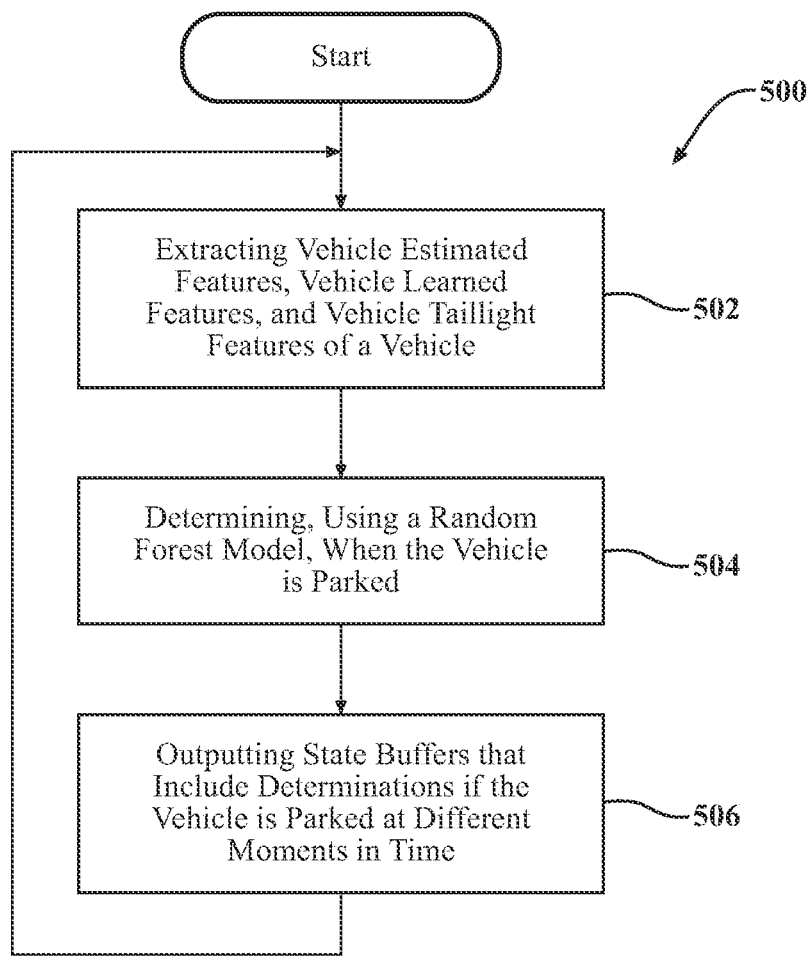
FIG. 8 illustrates a method for determining if a vehicle is parked.

Referring to FIG. 8, a method 500 for determining if the vehicle is parked shown. The method 500 will be described from the viewpoint of the ego vehicle 100 of FIG. 2 and the parked vehicle classifier system 170 of FIG. 3. However, it should be understood that this is just one example of implementing the method 500. While method 500 is discussed in combination with the parked vehicle classifier system 170, it should be appreciated that the method 500 is not limited to being implemented within the parked vehicle classifier system 170 but is instead one example of a system that may implement the method 500. It is noted that many of the steps of the method 500 were described above. Unless stated otherwise, the previously provided description is equally applicable to the steps of the method 500.

In step 502, the parking determination module 181 may cause the processor(s) 110 to extract vehicle estimated features, vehicle learned features, and vehicle taillight features of one or more external vehicles. As stated previously, the vehicle estimated features can include a number of different features such as an object type of the external vehicle, a distance from a center point of the external vehicle to a road boundary, an estimated velocity of the external vehicle, an estimated absolute speed of the external vehicle, a distance to the nearest intersection from the external vehicle, a map location type, a free lane ratio, an edge distance between an edge of the external vehicle and the road boundary.

The vehicle learned features may be extracted by the vehicle features model 194 and may include a learned velocity and/or learned absolute speed of the external vehicle. The learned velocity may include velocities in the X and Y directions. In one example, the vehicle features model 194 may be one or more neural networks that can determine the vehicle learned features. The vehicle features model 194 may use a deep learning framework that receives, as inputs, two separate and consecutive LIDAR sweeps 300 and 302, which may be in the form of point clouds, from the LIDAR sensor(s) 124 of the sensor system 120, at two different moments in time. As explained previously, the deep learning framework leverages contextual knowledge of the scene and generalizes to properly estimate the motion of objects.

Also explained previously, the vehicle taillight features may be extracted by selectively focusing a CNN of a CNN-LSTM framework on a selected region of the sequence of images according to a spatial attention model for a vehicle taillight recognition task. A spatial attention model may be integrated with a CNN of the CNN-LSTM framework for training the CNN-LSTM framework to selectively focus on certain regions of the images in a sequence of images. In addition, a temporal attention model is integrated with an LSTM network of the CNN-LSTM framework for helping train the LSTM network to perform frame selection within the selected region of the sequence of images. For example, the spatial attention model may be configured along a temporal dimension (e.g., direction) to focus on portions of the sequence of images important to vehicle taillight recognition.

In step 504, the parking determination module 181 may cause the processor(s) 110 to determine, using the random forest model 192, when one or more vehicles external to the ego vehicle 100 are parked based on vehicle estimated features, vehicle learned features, and vehicle taillight features. The random forest model 192 may utilize ensemble learning method for classification that operates by constructing a multitude of decision trees at training time and outputting the class that is the mode of the classes of the individual trees. In this case, the class output by the random forest model 192 is a determination of a particular external vehicle is parked or not.

In step 506, the parking determination module 181 may cause the processor(s) 110 to out a plurality of state buffers. Each state buffer may relate to a different moment in time, indicating if a particular vehicle is parked or not. The state buffers can then be provided to one or more downstream tasks, such as vehicle motion planning. For example, state buffers may be provided to the autonomous driving system 160 to assist the autonomous driving system 160 with planning the motion of the ego vehicle 100.

FIG. 1 will now be discussed in full detail as an example environment within which the system and methods disclosed herein may operate. In one or more embodiments, the ego vehicle 100 is an autonomous vehicle. As used herein, "autonomous vehicle" refers to a vehicle that operates in an autonomous mode. "Autonomous mode" refers to navigating and/or maneuvering the ego vehicle 100 along a travel route using one or more computing systems to control the ego vehicle 100 with minimal or no input from a human driver. In one or more embodiments, the ego vehicle 100 is highly automated or completely automated. In one embodiment, the ego vehicle 100 is configured with one or more semi-autonomous operational modes in which one or more computing systems perform a portion of the navigation and/or maneuvering of the ego vehicle 100 along a travel route, and a vehicle operator (i.e., driver) provides inputs to the vehicle to perform a portion of the navigation and/or maneuvering of the ego vehicle 100 along a travel route.

The ego vehicle 100 can include one or more processor(s) 110. In one or more arrangements, the processor(s) 110 can be a main processor of the ego vehicle 100. For instance, the processor(s) 110 can be an electronic control unit (ECU). The ego vehicle 100 can include one or more data store(s)

115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected" and/or "in communication with" used throughout this description can include direct or indirect connections, including connections without direct physical contact.

In one or more arrangements, the data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The data store(s) 115 can include sensor data 119. In this context, "sensor data" means any information about the sensors that the ego vehicle 100 is equipped with, including the capabilities and other information about such sensors. As will be explained below, the ego vehicle 100 can include the sensor system 120. The sensor data 119 can relate to one or more sensors of the sensor system 120.

In some instances, at least a portion of the map data 116 and/or the sensor data 119 can be located in the data store(s) 115 located onboard the ego vehicle 100. Alternatively, or in addition, at least a portion of the map data 116 and/or the sensor data 119 can be located in the data store(s) 115 that are located remotely from the ego vehicle 100.

As noted above, the ego vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the ego vehicle 100 (including any of the elements shown in FIG. 1). The sensor system 120 can acquire data of at least a portion of the external environment of the ego vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the ego vehicle 100 itself. In one or more arrangements, the vehicle sensor(s) 121 can be configured to detect, and/or sense position and orientation changes of the ego vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the ego vehicle 100. In one or more arrangements, the vehicle sensor(s) 121 can include a speedometer to determine a current speed of the ego vehicle 100.

Alternatively, or in addition, the sensor system 120 can include one or more environment sensor(s) 122 configured to acquire, and/or sense driving environment data. "Driving environment data" includes data or information about the external environment in which an autonomous vehicle is located or one or more portions thereof. For example, the environment sensor(s) 122 can be configured to detect, quantify, and/or sense obstacles in at least a portion of the external environment of the ego vehicle 100 and/or information/data about such obstacles. Such obstacles may be stationary objects and/or dynamic objects. The environment sensor(s) 122 can be configured to detect, measure, quantify and/or sense other things in the external environment of the ego vehicle 100, such as, for example, lane markers, signs, traffic lights, traffic signs, lane lines, crosswalks, curbs proximate the ego vehicle 100, off-road objects, etc.

Various examples of sensors of the sensor system 120 will be described herein. The example sensors may be part of the one or more environment sensor(s) 122 and/or the one or more vehicle sensor(s) 121. However, it will be understood that the embodiments are not limited to the particular sensors described.

As an example, in one or more arrangements, the sensor system 120 can include one or more radar sensor(s) 123, one or more LIDAR sensor(s) 124, one or more sonar sensor(s) 125, and/or one or more camera sensor(s) 126. In one or more arrangements, the one or more camera sensor(s) 126 can be high dynamic range (HDR) cameras or infrared (IR) cameras.

The ego vehicle 100 can include an input system 130. An "input system" includes any device, component, system, element or arrangement, or groups that enable information/data to be entered into a machine. The input system 130 can receive an input from a vehicle passenger (e.g., a driver or a passenger). The ego vehicle 100 can include an output system 135. An "output system" includes any device, component, or arrangement, or groups thereof that enable information/data to be presented to a vehicle passenger (e.g., a person, a vehicle passenger, etc.).

The ego vehicle 100 can include one or more vehicle systems 140. Various examples of the one or more vehicle systems 140 are shown in FIG. 1. However, the ego vehicle 100 can include more, fewer, or different vehicle systems. It should be appreciated that although particular vehicle systems are separately defined, each or any of the systems or portions thereof may be otherwise combined or segregated via hardware and/or software within the ego vehicle 100. The ego vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the ego vehicle 100 and/or to determine a travel route for the ego vehicle 100. The navigation system 147 can include one or more mapping applications to determine a travel route for the ego vehicle 100. The navigation system 147 can include a global positioning system, a local positioning system, or a geolocation system.

The processor(s) 110, the parked vehicle classifier system 170, and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the ego vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the ego vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the ego vehicle 100 by controlling one or more of the vehicle systems 140 and/or components thereof. For instance, when operating in an autonomous mode, the processor(s) 110 and/or the autonomous driving system 160 can control the direction and/or speed of the ego vehicle 100. The processor(s) 110 and/or the autonomous driving system 160 can cause the ego vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, directly or indirectly.

The ego vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The ego vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The autonomous driving system 160 can be configured to receive data from the sensor system 120 and/or any other type of system capable of capturing information relating to the ego vehicle 100 and/or the external environment of the ego vehicle 100. In one or more arrangements, the autonomous driving system 160 can use such data to generate one or more driving scene models. The autonomous driving system 160 can determine the position and velocity of the ego vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the ego vehicle 100 for use by the processor(s) 110, and/or one or more of the modules described herein to estimate position and orientation of the ego vehicle 100, vehicle position in global coordinates based on signals from a plurality of satellites, or any other data and/or signals that could be used to determine the current state of the ego vehicle 100 or determine the position of the ego vehicle 100 with respect to its environment for use in either creating a map or determining the position of the ego vehicle 100 in respect to map data.

The autonomous driving system 160 can be configured to determine travel path(s), current autonomous driving maneuvers for the ego vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the ego vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the ego vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining if a vehicle is parked comprising:
    a processor;
    a sensor system in communication with the processor, the sensor system being configured to detect the vehicle within an environment and output sensor data and includes a LIDAR sensor;
    a memory in communication with the processor, the memory having a parking determination module having instructions that, when executed by the processor, cause the processor to determine, using a random forest model, when the vehicle is parked based on vehicle estimated features, vehicle learned features, and vehicle taillight features of the vehicle that are based on sensor data, the vehicle learned features are determined by a deep learning framework that uses at least two consecutive point cloud sweeps by the LIDAR sensor of the environment that includes the vehicle; and
    wherein the vehicle estimated features include a distance to a nearest intersection from the vehicle, an edge distance between an edge of the vehicle and the road boundary, and a distance from a center point of the vehicle to a road boundary.

2. The system of claim 1, wherein the vehicle estimated features further include one or more of:
    an object type of the vehicle;
    an estimated velocity of the vehicle;
    an estimated absolute speed of the vehicle;
    a map location type;
    a free lane ratio; and
    a determination of the vehicle is located in a parking lane.

3. The system of claim 1, wherein the vehicle learned features include one or more of a learned velocity and a learned absolute speed.

4. The system of claim 1, wherein the vehicle taillight features include one or more of:
    a taillight off probability;
    a left taillight on probability;
    a right taillight on probability; and
    a hazard light on probability.

5. The system of claim 4, wherein the vehicle taillight features are determined using a convolutional neural network (CNN) of a CNN-long short-term memory (CNN-LSTM) framework based on selected regions of a sequence of images of the environment that includes the vehicle.

6. The system of claim 1, wherein the parking determination module further includes instructions that, when executed by the processor, cause the processor to output a plurality of state buffers, wherein the state buffers include a determination if the vehicle is parked at different moments in time.

7. A method for determining if a vehicle is parked comprising the step of:
    determining, using a random forest model, when the vehicle is parked based on vehicle estimated features, vehicle learned features, and vehicle taillight features of the vehicle;
    wherein the vehicle estimated features include a distance to a nearest intersection from the vehicle, an edge distance between an edge of the vehicle and the road boundary, and a distance from a center point of the vehicle to a road boundary; and
    wherein the vehicle learned features are determined by a deep learning framework that uses at least two consecutive point cloud sweeps of an environment that includes the vehicle.

8. The method of claim 7, wherein the vehicle estimated features further include one or more of:
    an object type of the vehicle;
    an estimated velocity of the vehicle;
    an estimated absolute speed of the vehicle;
    a map location type;
    a free lane ratio; and
    a determination of the vehicle is located in a parking lane.

9. The method of claim 7, wherein the vehicle learned features include one or more of a learned velocity and a learned absolute speed.

10. The method of claim 7, wherein the vehicle taillight features include one or more of:
    a taillight off probability;
    a left taillight on probability;
    a right taillight on probability; and
    a hazard light on probability.

11. The method of claim 10, wherein the vehicle taillight features are determined using a convolutional neural network (CNN) of a CNN-long short-term memory (CNN-LSTM) framework based on selected regions of a sequence of images of an environment that includes the vehicle.

12. The method of claim 7, further comprising the step of outputting a plurality of state buffers, wherein the state buffers include a determination if the vehicle is parked at different moments in time.

13. A non-transitory computer readable medium having instructions that, when executed by a processor, cause the processor to:
    determine, using a random forest model, when a vehicle is parked based on vehicle estimated features, vehicle learned features, and vehicle taillight features of the vehicle;
    wherein the vehicle estimated features include a distance to a nearest intersection from the vehicle, an edge distance between an edge of the vehicle and the road boundary, and a distance from a center point of the vehicle to a road boundary; and
    wherein the vehicle learned features are determined by a deep learning framework that uses at least two consecutive point cloud sweeps of an environment that includes the vehicle.

14. The non-transitory computer readable medium of claim 13, wherein the vehicle estimated features further include one or more of:

an object type of the vehicle;
an estimated velocity of the vehicle;
an estimated absolute speed of the vehicle;
a map location type;
a free lane ratio; and
a determination of the vehicle is located in a parking lane.

15. The non-transitory computer readable medium of claim 13, wherein the vehicle learned features include one or more of a leaned velocity and a learned absolute speed.

16. The non-transitory computer readable medium of claim 15, wherein the vehicle taillight features include one or more of:
a taillight off probability;
a left taillight on probability;
a right taillight on probability; and
a hazard light on probability.

17. The non-transitory computer readable medium of claim 16, wherein the vehicle taillight features are determined using a convolutional neural network (CNN) of a CNN-long short-term memory (CNN-LSTM) framework based on selected regions of a sequence of images of an environment that includes the vehicle.

* * * * *